United States Patent [19]

Kozora

[11] Patent Number: 4,636,240

[45] Date of Patent: Jan. 13, 1987

[54] PLUNGER ASSEMBLY FOR GLASS CONTAINER MANUFACTURING

[76] Inventor: Joseph W. Kozora, P.O. Box 559, Valencia, Pa. 16059

[21] Appl. No.: 687,594

[22] Filed: Dec. 31, 1984

[51] Int. Cl.⁴ ............................................... C03B 9/00
[52] U.S. Cl. ........................................ 65/229; 65/322; 65/362
[58] Field of Search ................. 65/229, 308, 319, 322, 65/356, 362

[56] References Cited

U.S. PATENT DOCUMENTS

| | | | |
|---|---|---|---|
| 3,314,775 | 4/1967 | Shelter et al. | 65/322 |
| 3,573,025 | 3/1971 | Hamilton | 65/322 |
| 3,607,206 | 9/1971 | Foster et al. | 65/319 |
| 3,671,211 | 6/1972 | Lloyd | 65/362 |
| 4,033,744 | 7/1977 | Davis | 65/319 |
| 4,272,272 | 6/1981 | Trahan et al. | 65/319 |

Primary Examiner—S. Leon Bashore
Assistant Examiner—Michael K. Boyer
Attorney, Agent, or Firm—George C. Atwell

[57] ABSTRACT

Equipment for glass container manufacturing wherein a plunger used to form a parison in a glass container forming operation is provided with a cylindrical sleeve adapted to lock the plunger base end against a support member firmly fastened to a reciprocal piston. The sleeve is spring-loaded to hold it in operative position and permit lateral limited adjustment during operation, and may be manually elevated to facilitate quick rotative removal of installation of the plunger.

13 Claims, 14 Drawing Figures

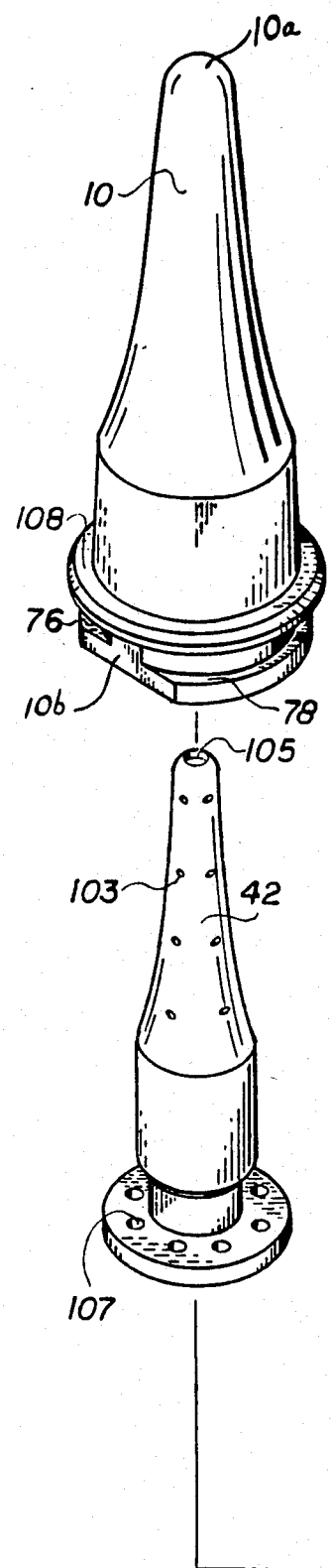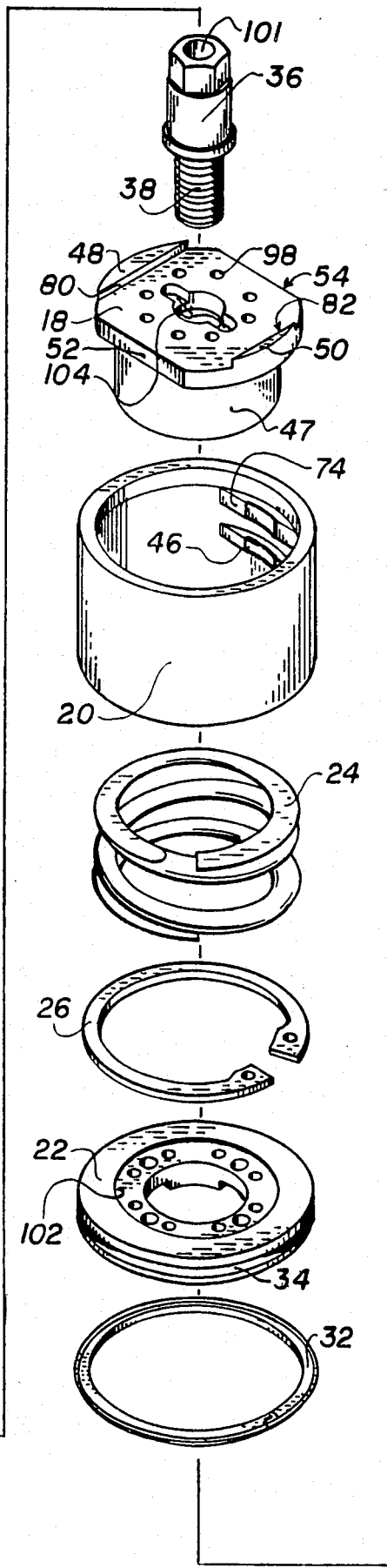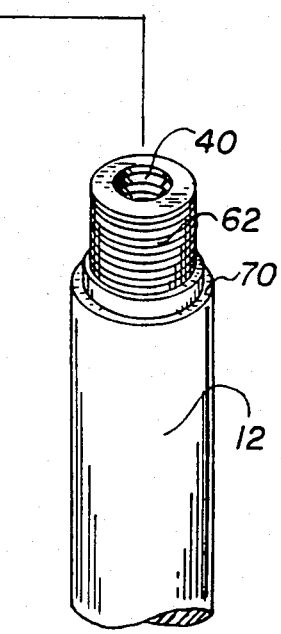
FIG. 2

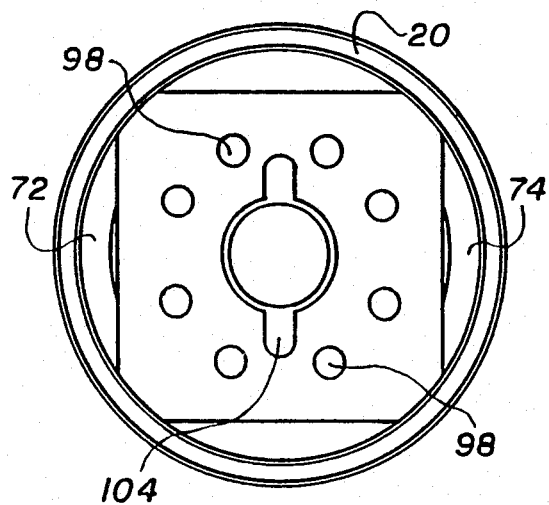
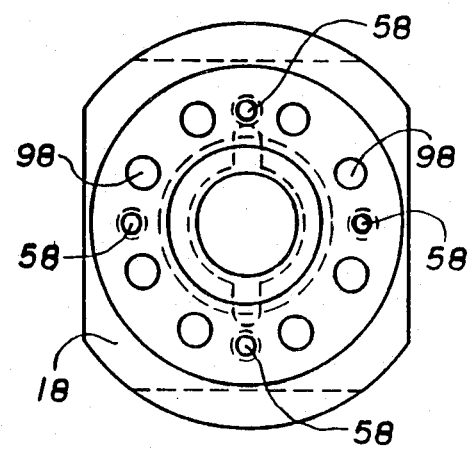
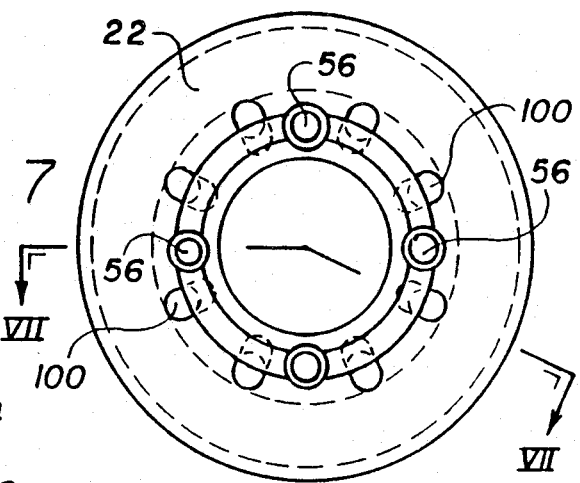
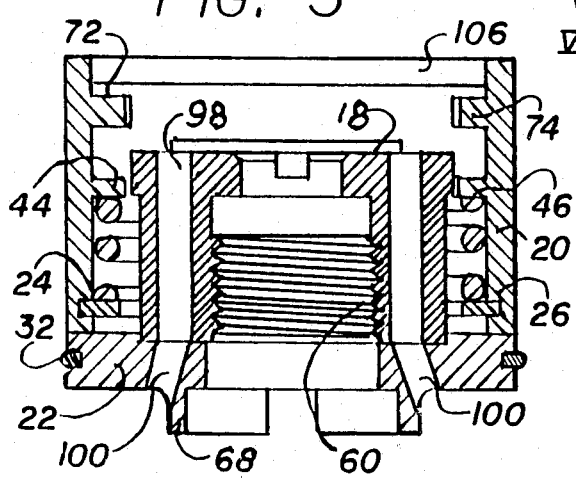
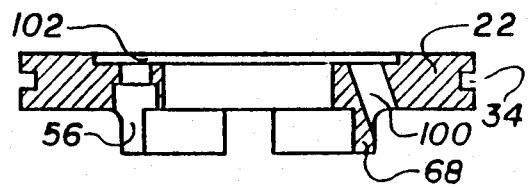

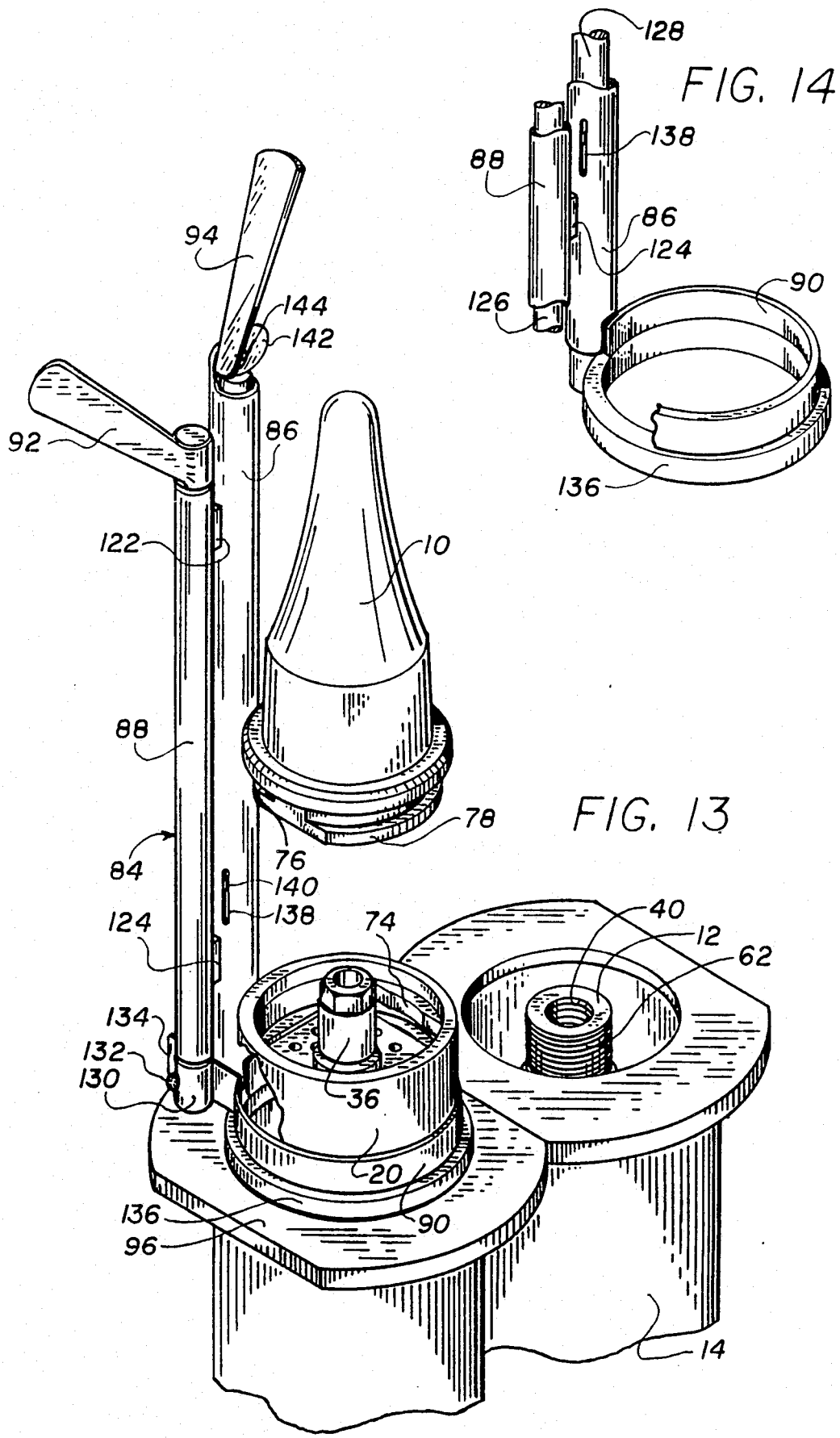

PLUNGER ASSEMBLY FOR GLASS CONTAINER MANUFACTURING

BACKGROUND OF THE INVENTION

This invention relates generally to apparatus or equipment for manufacturing glass containers, and, more particularly, pertains to an improved plunger assembly intended for use in what is known in the art as the press and blow process for glass bottle forming.

In the typical glass container manufacturing operation, gobs of molten glass are sequentially fed into a blank mould wherein each gob is subjected to an initial forming action. The gob is held in the blank mould and a plunger is inserted to form the gob into a parison by a pressing operation, after which the plunger is withdrawn and the parison is thereafter subjected to a blowing operation to complete the formation of the container.

It is currently typical in the art to utilize a plunger removably mounted on a piston-carried plunger head. The means of mounting the plunger to the plunger head usually comprises a pair of arcuate "split rings" which in their operative position abut to form a circular clamp surrounding the base end of the plunger and part of the plunger head. A surrounding cylinder in which the plunger assembly is reciprocally disposed, maintains the split rings in their operative position.

A prior art assembly as heretofore described is clearly illustrated in U.S. Pat. No. 4,033,744 issued to Robert Earl Davis on July 5, 1977, particularly in FIG. 1 of the drawings of that patent. The Davis patent is directed to the provision of a modified plunger assembly which eliminates the split rings and provides a rotable interlock between a plunger and a plunger head. The Davis assembly appears to offer definite advantages over the aforedescribed split ring concept but in use, it has proven to have certain inherent disadvantages which it was intended to correct. Because of the unreliable locking system between the plunger and the plunger head, users have found it necessary to originate additional cumbersome securing structure to maintain the plunger in operative position. Moreover, the Davis system will not accept adapted present components.

The prior art, in general, has many inherent shortcomings. There is no quick-change, self-aligning plunger mounting system available that is easily adapted to moulding equipment of different manufacturers. Because of wear characteristics inherent in the operation, expensive alloys are utilized for parts subjected to such wear. Present systems do not provide optimum alignment of the plunger relative to its support structure or the blank mould which results in non-uniform glass distribution.

Another problem associated with prior art equipment relates to the extreme inefficiency of air cooling of the plunger during its operation. The plunger is provided with an internal nozzle which receives a compressed air flow centrally upwardly therethrough. The air flow is distributed against the inside surface of the plunger and is exhausted downwardly through a series of relatively small exhaust ports provided through the mounting components. Air leakage at the point of merger between the various components is common. Such leakage and poor control of the air flow results in undesirable blow-by of exhausting air. A related problem is the need for excessive lubrication of the moving components to minimize wear. Build-up of lubricant and the random scattering of leaking air can be seen in excessive product specking.

In typical prior art equipment, optimum performance and positive positioning of the plunger are obtained when all components are new, but performance quality rapidly diminishes during use due to frictional scraping and scoring between contacting components.

SUMMARY OF THE INVENTION

The present invention comprehends an improved plunger assembly for use in a glass forming machine. The improved plunger assembly is primarily intended for use in what is known in the art as the press and blow process of forming glass containers, although the inherent efficiency of the disclosed assembly suggests its adaption for use in glass container forming by the blow and blow process.

The improved plunger assembly comprises a plunger support member having a piston-engaging end and a face end adapted to register with the base end of a plunger. The support member is contained within a cylindrical sleeve having oppositely-disposed inward integral projections for engaging cooperating lips or ridges at the base end of the plunger. The cylindrical sleeve is normally disposed with its lower edge resting on a centrally bored spacer member which is secured to the piston-engaging end of the support member. The annular sleeve is adapted to be manually moved a short distance axially away from the spacer plate to enable installation or removal of the plunger base from its mounted position on the support member carried within the sleeve. Biasing means is provided within the sleeve for urging the sleeve in registration with the spacer member during actual operation of the assembly.

A sealing or wiping ring is preferably mounted in an accommodating annular slot on the spacer plate, and the wiping ring is preferably provided with innerconnecting slidable ends which aid in reducing undesirable blow-by, as will be hereafter described in greater detail.

It is a primary objective of the present invention to provide an improved plunger assembly for use in a glass forming machine which will be easily adaptable to the mould equipment now supplied by various established manufacturers in the industry.

It is a further objective of the present invention to provide such an assembly having an inherent feature of rapid plunger installation and removal.

It is another objective of the present invention to provide an improved plunger assembly of the type described which provides improved plunger alignment and automatic radial adjustment of a major connecting component of the assembly.

It is also an objective of the present invention to provide an improved plunger assembly requiring minimal lubrication between contacting parts while nevertheless extending the useful life and optimum performance of such parts.

A still further objective of the present invention is to provide an improved plunger assembly of the type described where air leakage is comparatively negligible and the air flow pressure required for operation of the equipment is significantly reduced.

Other features and advantages provided by the present invention will become apparent from the ensuing detailed description of the invention's presently preferred embodiment.

BRIEF DESCRIPTION OF THE DRAWINGS

FIG. 2 is an exploded view illustrating the components of the improved plunger assembly first shown in FIG. 1 and here shown in larger scale as compared with FIG. 1 and illustrating, in perspective view, the major plunger mounting components of the assembly;

FIG. 3 is an enlarged side elevational view in vertical section of certain components of the present invention first shown in FIG. 1;

FIG. 6 is a side elevational view in vertical section of a component of the invention shown in FIG. 3;

FIG. 7 is a bottom plan view of the component of the invention shown in FIG. 6;

FIG. 8 is a top plan view of the component assembly shown in FIG. 3;

FIG. 9 is a bottom plan view of a support member component of the invention shown in FIG. 3;

FIGS. 13 and 14 are an isometric view illustrating a typical glass forming machine with the present invention in combination therewith and the utilization of a special tool for rapidly accomplishing plunger installation or removal.

DETAILED DESCRIPTION OF THE PREFERRED EMBODIMENT

Figure 1:
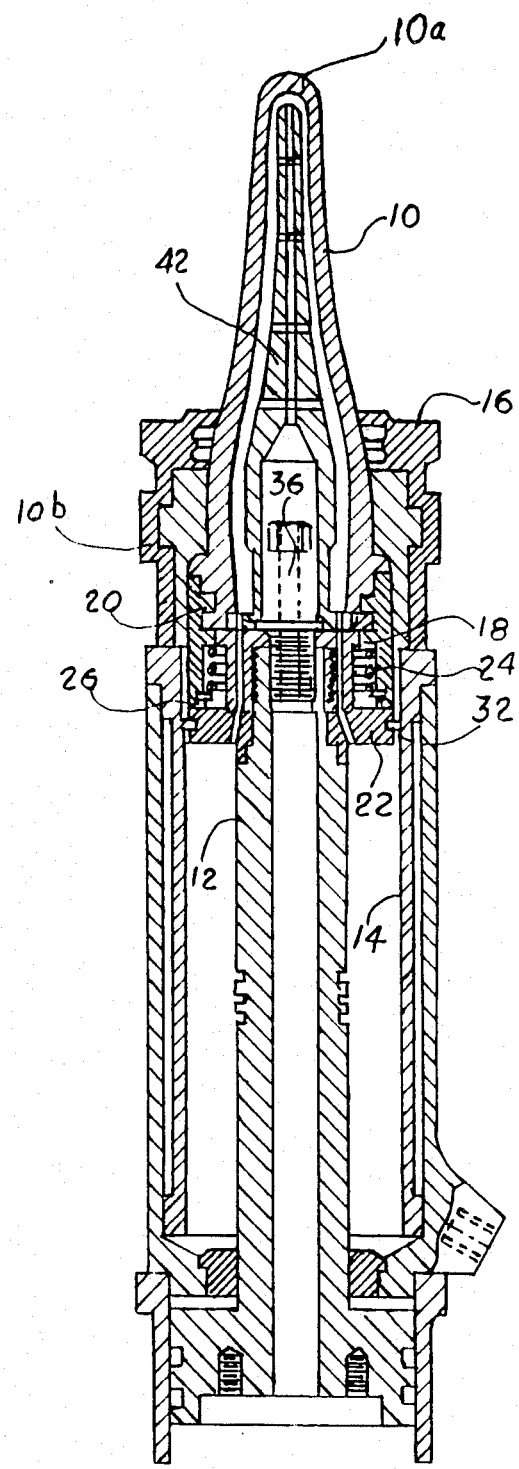
FIG. 1 is a side elevational view in vertical section of the improved plunger assembly of the present invention, in its installed operative position.
Figure 5:
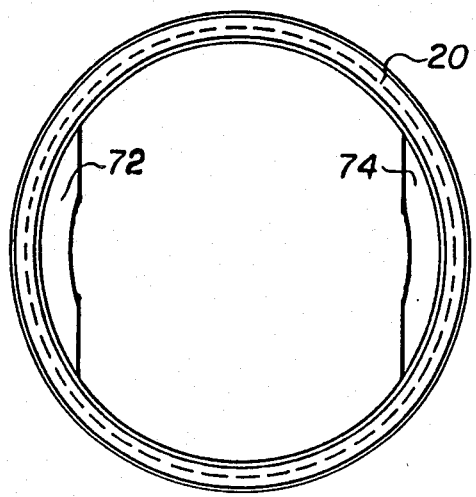
FIG. 5 is a top plan view of the component shown in FIG. 4.

In FIG. 1, there is shown a plunger 10 mounted on a vertically reciprocal piston 12. The piston 12 is contained within a stationary cylinder 14. A blank mould (not shown) would be positioned above the plunger 10 and in contact with a finish ring 16. In operation, the cylinder 12 is air driven upwardly whereby the plunger enters the mould and initially forms the molten glass gob contained therein. The molten glass conforms to the general shape of the plunger 10 and the inside surface configuration of the finish ring 16, the latter forming the threaded neck portion of the glass container to be finally formed. The plunger 10 has a nose end 10a and a base end generally identified as 10b.

The plunger 10 is mounted to the piston 12 by a component assembly shown in both FIGS. 1 and 2 which includes a rigid centrally bored support member 18, a cylindrical sleeve 20, and a spacer member 22 which attaches to the undersurface of the support member 18.

Figure 4:
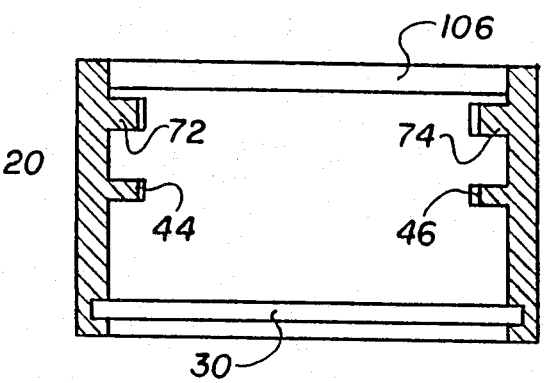
FIG. 4 is a side elevational view in vertical section of one component taken from FIG. 3.

Certain of the mounting assembly components shown in FIGS. 1 and 2 are more clearly illustrated in FIG. 3 where they are disposed in their interrelated operative position. The mounting assembly components further include a spring member 24 disposed within the sleeve 20 and surrounding the support member 18, and a snap ring 26 carried in an accommodating annular slot 30 (see FIG. 4) provided in the lower end of the sleeve 20.

FIGS. 1 and 2 also show a sealing or wiping ring 32 which is operatively carried in an annular slot 34 provided in the spacer member 22, and a center post member 36 having a lower end threaded portion 38 for threadably engaging an internally threaded bore 40 of the piston 12, as will be hereafter described in greater detail. An air flow distributor 42, such as commonly used in glass container forming equipment, is provided for internal installation within the plunger 10.

The operation of the improved plunger assembly shown in FIGS. 1 and 2 and the significant advantages obtained from it, will be best understood from a description of the initial assembly and installation of the various components. The piston 12 and cylinder 14 constitute known standard equipment in the industry, and the purpose of this invention is to mount the plunger to the piston with a structurally and functionally superior mounting system which is shown pre-assembled in FIG. 3 just prior to its installation onto the piston 12. The unit shown in FIG. 3 is assembled by first installing the spring 24 within the sleeve 20. The sleeve 20 is provided with inwardly projecting oppositely disposed ledges 44 and 46 which position the sleeve 20 relative to the support member 18. The spring 24 is compressibly contained between the ledges 44 and 45, at its topside, and the snap ring 26 carried in the slot 30, at its underside.

Following installation of the spring member 24 into the sleeve 20, the support member 18 is installed downwardly through the sleeve to the position shown in FIG. 3. Th support member 18 has a lower end cylindrical body portion 47 (FIG. 1) and its upper or face end is shaped to have oppositely disposed arcuate flange portions 48 and 50 which conform to the inside surface of the sleeve 20. The upper end of the support member 18 also has oppositely disposed planar surfaces 52 and 54 which are, respectively, contiguously disposed against the sleeve ledges 44 and 46. The ledges 44 and 46 respectively interact with surfaces 52 and 54 to prevent rotation of sleeve 20 relative to member 18.

Once the support member 18 is installed as shown in FIG. 3, the spacer plate 22 (FIG. 6) is installed in the position shown in FIG. 3 by securing it to the undersurface of the support member 18. This is accomplished by the use of threaded fasteners (not shown) which are inserted into openings 56 (FIG. 7). The fasteners are inserted into openings 56 (FIG. 7) and screwed into accommodating holes 58 (FIG. 9). Assuming the wiping ring 32 is in its installed position in the slot 34 of the spacer member 22, the unit shown in FIG. 3 is ready for installation on the piston 12.

The support member 18 is centrally bored and has internal threads 60 in the lower part of the central bore to enable the unit shown in FIG. 3 to be threadably installed on external thread 62 at the upper end of the piston 12. The underside of the spacer member 22 is provided with a downwardly projecting collar portion 68 which registers with an accommodating annular shoulder 70 on the piston 12.

Once the unit shown in FIG. 3 is installed, as heretofore described, on the piston 12, the post member 36 is installed by inserting its lower end 38 downwardly-centrally through the support member 18 and rotably screwing it into the internally threaded bore 40 of the piston 12. At this point, installation of the plunger 10 to its mounted position shown in FIG. 1 may be accomplished.

FIG. 13 shows the unit illustrated in FIG. 3 mounted on the piston 12, with the post 36 installed as heretofore described. Now it is important to note that the sleeve 20 is also provided with oppositely disposed integral internally projecting shoulders 72 and 74 which have inwardly facing configurations quite similar to ledges 44 and 46. The plunger 10 is configured to have, at its base end, laterally projecting arcuate flange or ear portions 76 and 78 which project beneath the shoulders 72 and 74 when the plunger is in its installed position.

Not shown in FIG. 13 is the air distributor 42 (FIG. 1) which would be placed in position over the post 36 prior to installation of the plunger. The sleeve 20 is normally held downwardly against the upper surface of the spacer member 22 by force of the spring member 24 pressing between the undersurfaces of the arcuate upper end portions 48 and 50 of the support member, and the snap ring 26. To quickly install the plunger 10 to its operative position shown in FIG. 1, the sleeve 20 (FIG. 13) is elevated a short distance away from the spacer member 22, compressing the spring 24, whereby the shoulders 72 and 74 move upwardly an equal distance relative to the upper end of the support member 18. The plunger 10 is then installed by inserting its base end into the upper end of the sleeve and the plunger is rotably aligned so that the flanges 76 and 78 register squarely on the arcuate upper end portions 48 and 50 of the support member 18. The plunger is then rotated manually 90° to bring the flanges 76 and 78 directly beneath the shoulders 72 and 74 at which point the plunger will "seat" between parallel edges 80 and 82 constituting the inside surfaces of respective upper end portions 48 and 50 of the support member 18. Subsequent release of the sleeve 20 from its elevated position locks the plunger 10 into position whereby it is ready for operational use.

Rapid installation and removal of the plunger 10 from its mounted operative position is preferably accomplished by a special tool 84, shown in FIG. 13, specifically devised for this purpose. The tool 84 comprises parallel first and second posts 86 and 88, and a clamping band 90 is operationally connected to the post 88. To elevate the sleeve 20, in installing and removing the plunger 10, the tool 84 is quickly placed in position whereby the lower end of post 86 is bearing against the stationary cylinder flange 96 and the clamping bank 90 is around the sleeve 20. The handle 92 at the upper end of the tool 84 is rotated 90° to clamp the band 90 tightly onto the sleeve 20 whereupon the handle 94 is manually moved through a vertical plane, in the direction of the arrow shown in FIG. 13, to thereby cam the post 86 vertically relative to the post 88 and lift the sleeve 20 the short distance necessary to enable rotative installation or removal of the plunger 10.

It is well known in the art of glass container forming machinery to reciprocally drive the piston and hence the plunger with compressed air and to provide a coolant air flow to the plunger. The use of an air distributor within the plunger is well known, as is the provision of exhaust air passages through the various mounting components whereby the air flow pathway comes centrally upwardly through the piston and is dispersed by the distributor within the plunger and returned downwardly into the ambient space between the piston and the cylinder. As in the prior art, various components of the present invention are provided with internal ports which constitute segments of exhaust air passages.

Openings or ports are provided in the support member 18 and the spacer member 22 to accommodate the exhaust air flow. Specifically, a plurality of ports 98 are provided in the support member 18. The ports 98 are arranged in a circular equidistantly spaced pattern, opening on the upper or face end of the support member 18 and emerging on the lower or base end thereof. A similarly arranged plurality of ports 100 is provided through the spacer member 22 whereby they are in flow communication with the ports 98 in the support member. As compared to equipment of the prior art, the structure of this invention provides precise control of exhaust coolant air flow whereby detrimental effect to the glass product is virtually eliminated. Exhaust air flow passageways are comparatively direct and unobstructed, and firm sealing registration between the ported components is maintained. Hence, the air leakage and blow-by inherent in the prior art split ring retaining clamp system is eliminated. Moreover, the exhaust air flow is emitted into the cylinder 14 and outwardly therefrom at a point adjacent the cylinder's base, all on the downstream side of the wiping seal 28 which acts as a dynamic barrier, in combination with the inside surface of the cylinder 14, to prevent exhaust air from escaping upwardly toward the area of the neck ring 16.

During operation of the glass container forming equipment, as shown in FIG. 1, pressurized coolant air is directed upwardly through the central bore in the piston 12 and thence into the distributor 42 by passage through a communicating central bore 101 in the post 36. The air flow is dispersed outwardly from the distributor through a series of small sidewall openings 103 and a nose end hole 105 to cool the plunger 10. The travel of the exhaust air flow commences through a series of circumferentially arranged equidistantly spaced ports 107 in the bottom flange of the distributor 42. On the underside of the distributor base, these ports terminate in a common annular recess (not shown). The distributor 42 is centered by the post 36 whereby its base is contiguous to the upper surface of the support member 18 and the aforementioned annular recess aligns in circumjacent registration over the openings of ports 98 through the support member 18. Accordingly, alignment of the ports in the base of the distributor 42 with the ports 98 is not required since the recess acts as a communicating flow channel therebetween.

Ports 98 through the support member 18 emerge on the support member's undersurface where they are in flow communication with ports 100 in the spacer member 22. From the ports 100 the air flow is emitted into the space circumjacent the piston 12 within the cylinder 14.

It should be noted that certain of the components of the presently preferred embodiment of the plunger assembly are closely interfitted to maintain predetermined alignment. The upper surface of the spacer member 22 is preferably provided with an annular recess 102 so the spacer member 22 will concentrically align and register with the lower end of the support member 18. The support member 18, adjacent the upper end of its central bore, is also provided with oppositely disposed recesses 104 to accommodate a special tool (not shown) which is inserted across the bore to rotate the support member 18 and effect its rapid removal from the piston 12.

The sleeve 20, at its upper end, is provided with a inward annular radius 106 which allows some spacing relative to the undersurface shoulder of a flange 108 on the plunger 10. This feature, in combination with the maintenance of the widest diameter of the support member 18 slightly less than the inside diameter of the sleeve 20, and with similar limited spacing between other areas of abuttment of the sleeve 20 with the support member 18, permits limited automatic lateral shifting adjustment of the sleeve 20 as it is reciprocated within the cylinder 14.

Figure 11:
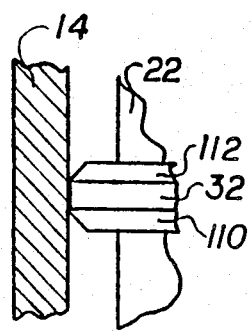
FIG. 11 is a fragmentary view in partial vertical section illustrating the operation of the wiping ring shown in FIG. 10.
Figure 10:
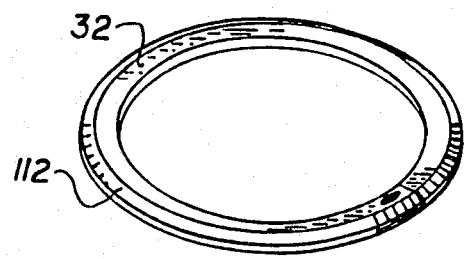
FIG. 10 is an isometric view of a sealing or wiping ring utilized in the present invention.
Figure 12:
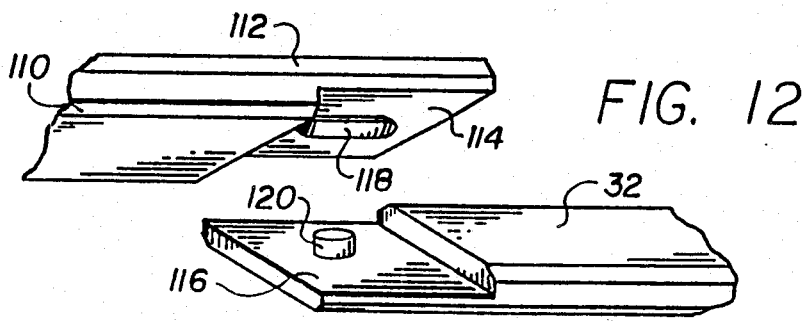
FIG. 12 is a fragmentary perspective view of a portion of the wiping ring shown in FIG. 10, in enlarged scale, illustrating the presently preferred means of joining the ends of the wiping ring shown in FIG. 10.

FIGS. 10, 11 and 12 show structural details of the wiping ring 32 which is carried in accommodating slot 34 of the spacer member 22. Use of a more typical piston ring having spaced ends and being loosely slot fitted to enable radial compression will substantially accomplish the desired purpose of preventing upward blow-by of exhaust air from the cylinder 14, however, the ring 32 is a desirable improvement as compared to more typical ring structures. As shown in FIGS. 10 and 12, the ring 32 is provided with slidable interlocking ends whereby the ring is a complete circle capable of radial compression and expansion. The ring thus acts as an uninterrupted barrier against exhaust air escape through the space between the spacer member sidewall and the cylinder 14, as shown in FIG. 11.

FIG. 11 also shows that the ring 32 is preferably provided with rearwardly tapering upper and lower annular surfaces 110 and 112. This configuration renders the ring 32 adaptable for use in a type of cylinder now employed in glass container forming equipment, which has a sidewall opening with edges which can be obstructions across the path of the ring 32. The sloped or ramp-shaped configuration of the outer edge of the ring 32 enables the ring to override the edges of the sidewall opening and not directly impinge thereagainst, thereby avoiding ring breakage. Alternatively, the ring 32 could be formed with a circular or oval configuration, as viewed in cross-section (not shown) to provide this overriding characteristic.

FIG. 12 is an enlargement of the interconnection of the ring ends, showing each end formed with respective tongue portions 114 and 116. An elongated slot 118 in the tongue portion 114 co-acts with a button portion 120 integral to the tongue portion 116 to enable a limited sliding action between the interconnected ends as the ring 32 radially compresses and expands within the slot 34 of the spacer member 22 during operation.

Assuming a clear understanding of the drawings and the foregoing description, a person skilled in the art should clearly appreciate the significant advantages and features of the improved plunger assembly herein disclosed. A notable advantage of this assembly over other known assemblies in common use is the positive positioning of the plunger on the piston whereby deflection of the plunger, a common problem in prior systems, is eliminated. This results in uniform formation and pressing of the gob that is successively consistent and concise. Reduced pressing pressure is required whereby blank mould splits, familiar in the pressing of gobs to form tall containers, are significantly reduced.

During operation of the improved plunger assembly, the sleeve 20 will automatically laterally self-adjust to reduce frictional wear, yet the spring member 24 constantly urges the sleeve in sealed relation against the spacer member 22 to maximize continuity of the cooling air flow.

The design of the improved plunger assembly and the interrelation of its parts results in minimal air leakage and coolant air exhaust confinement whereby carbon and other contaminants are not blown into the parison. Further, the need for extensive lubrication is obviated thus removing from the system an obvious source of contamination.

Reduced operational wear is a significant advantage of the improved plunger assembly. This advantage and the ease of adapting the assembly to different glass container forming equipment from various manufacturers, is of great economical significance to the industry. In most instances, only the base end of the plunger needs to be slightly modified, and, in some cases, a washer-like spacer may be required between the upper end of the cylinder and the neck ring to compensate for a difference in the axial dimension of the assembly introduced by the axial dimension on the sleeve 20.

FIGS. 13 and 14 in the drawings illustrate the operation of the tool 84. The tool 84 functions as a manually operated jack which retracts the sleeve 20 from its operative position and holds it in its retracted position to enable installation of the plunger. The embodiment of the tool 84 can be variously modified as to its structural configuration and nevertheless accomplish its desired function.

The illustrated embodiment of the tool 84 includes the tubular parallel posts 86 and 88 rigidly interconnected in a spaced orientation by web portions 122 and 124. A rotatable rod 126 is mounted within post 88 and a vertically reciprocal rod 128 is mounted within post 86. The clamping band 90 has one end weldably secured to the lower end of the post 86. The clamping band 90 is preferably spring steel which tends to retain the position shown in FIG. 13, prior to clamping, whereby it fits relatively loosely about the sleeve 20. The rod 126 is provided, at its lower end, with a secured bushing 130 having a laterally projecting boss 132 that acts to cam the clamping ring 90 tightly about the sleeve 20 when the handle 192 is manipulated to rotate the rod 126 whereby the boss 132 cams against tongue 134 extending from clamping ring 90.

As shown in FIG. 13, a positioning ring 136 is rigidly welded to the lower end of rod 128. The ring 136, which has an inside diameter slightly greater than the outside diameter of the sleeve 20, serves as a means of stabilizing the tool 84 relative to the sleeve 20. A small vertically elongated slot 138 is provided in the sidewall of post 86 and cooperates with a pin 140 projecting from rod 128, to retain the rod 128 in reciprocal slidable position within the post 86 whereby the rod will not drop out of the tool assembly when the tool is removed from its operative position and set aside for future use.

When it is desired to remove or install the plunger 10, the tool 84 is placed into the position shown in FIG. 13 and the handle 92 is rotated manually whereby such motion is translated through the rod 126 to cause the boss 132 to cam the tongue 134 and clamp the clamping ring 90 about the sleeve 20. The handle 94 is then manually rotated through a vertical plane whereby its camming portion 142 asserts a downward force against the upper end of the rod 128. The handle 94 is pivotally connected by a pivot pin 144 to the upper end of post 86 whereby the camming action is translated to the post 86, drawing it upwardly relative to the rod 128. The clamping ring 90 is drawn upwardly with the post 86 and jacks the sleeve 20 to a retracted position, compressing the spring 24 (FIG. 3) carried within the sleeve 20. The compressed spring 24 asserts a constant force, translated through the sleeve 20 and the clamping ring 90, pulling downwardly on the post 86. The camming portion 142 of the handle 94 is concentrically mounted and appropriately configured whereby, in combination with the constant spring force, it acts as a manually releasable detaining means, When the handle 94 is fully rotated clockwise as viewed in FIG. 13, the sleeve 20 is automatically held in its jacked retracted position until the handle 94 is counter-rotated to release it. Such counter-rotation of the handle 94, followed by counter-rotation of the handle 92 to unclamp the clamping ring 90, enables removal of the tool from its operative position relative to the plunger mounting assembly.

The structure of the presently preferred embodiment shown in the accompanying drawings is provided for the purpose of illustrating the invention and is not intended to limit modifications or variations which come within the scope of the invention. It is contemplated that the invention herein may be variously adapted by those skilled in the art, in light of the teachings herein, without departing from the spirit and scope of the invention as particularly defined in the appended claims.

I claim:

1. A plunger assembly for use in a glass forming machine comprising:
   a plunger having a nose end and a base end;
   a plunger support member having a piston-engaging end and a face end for registration with the base end of the plunger;
   a sleeve, disposed about the support member, having integral means engaging the plunger base end;
   biasing means, disposed between the sleeve and the support member, for exerting a pushing force therebetween to hold the integral means of the sleeve in firm contact with the plunger base end and thereby retain the plunger in operative position wherein the integral means of the sleeve comprises oppositely disposed shoulders projecting inwardly to the face end of the support member, and the plunger base end has oppositely laterally projecting flanges rotatively engaged between the shoulders and the face end.

2. The plunger assembly of claim 1 further comprising a spacer member secured to the piston-engaging end of the support member.

3. The plunger assembly of claim 2 wherein the spacer member has an annular sidewall surface defining an annular slot therein, and an annular ring is carried in the slot for wiping against the inside surface of a stationary cylinder of the forming machine during the operation thereof.

4. The plunger assembly of claim 3 wherein the annular ring is a spring member with adjacent ends, the spring member normally presses radially outwardly to circumferentially abut against the stationary cylinder wall and maintain a wiping action thereagainst, and the ring is radially compressible within the confines of the slot to accommodate the installation of the spacer member, with the ring carried thereon, within the stationary cylinder.

5. The plunger assembly of claim 4 wherein th ends of the annular ring have overlapping tongue portions to thereby maintain a substantially continuous outer surface, in the area of the overlap, against the cylinder wall.

6. The plunger assembly of claim 5 with means on one tongue portion defining a slot and means on the other tongue portion defining an integral projection slidably fitted into the slot to enable movement of the ends relative to each other as the annular ring undergoes compression and expansion within the slot.

7. The plunger assembly of claim 3 wherein:
   the outer surface of the annular ring normally projects outwardly from the slot and past the sidewall of the spacer members; and
   the ring has a ramp-shaped outer periphery to induce it to slide over obstructions in the cylinder sidewall.

8. The plunger assembly of claim 7 wherein the angle is in the range of 5 to 45 degrees.

9. The improved plunger assembly of claim 2 further including means defining respective axially aligned central bores in the spacer member and the support member.

10. The plunger assembly of claim 9 further including means defining an array of air passages in the support member which are disposed in a circular pattern circumjacent the support member's central bore and extending from its piston-engaging end to its face end, means defining an array of exhaust ports in the spacer member and circumjacent the central bore, and the exhaust ports disposed in sealed flow communication with the air passages in a divergent direction relative to the plunger.

11. The plunger assembly of claim 1 further including means acting between the sleeve and the support member to prevent relative rotation.

12. The plunger assembly of claim 1 wherein the sleeve has a snap ring carried in an internal annular groove and acting to retain the biasing means within the sleeve.

13. The plunger assembly of claim 1 wherein the sleeve is axially movable relative to the support menber to accommodate retention and release of the plunger face end.

* * * * *